United States Patent Office 3,300,248
Patented Jan. 24, 1967

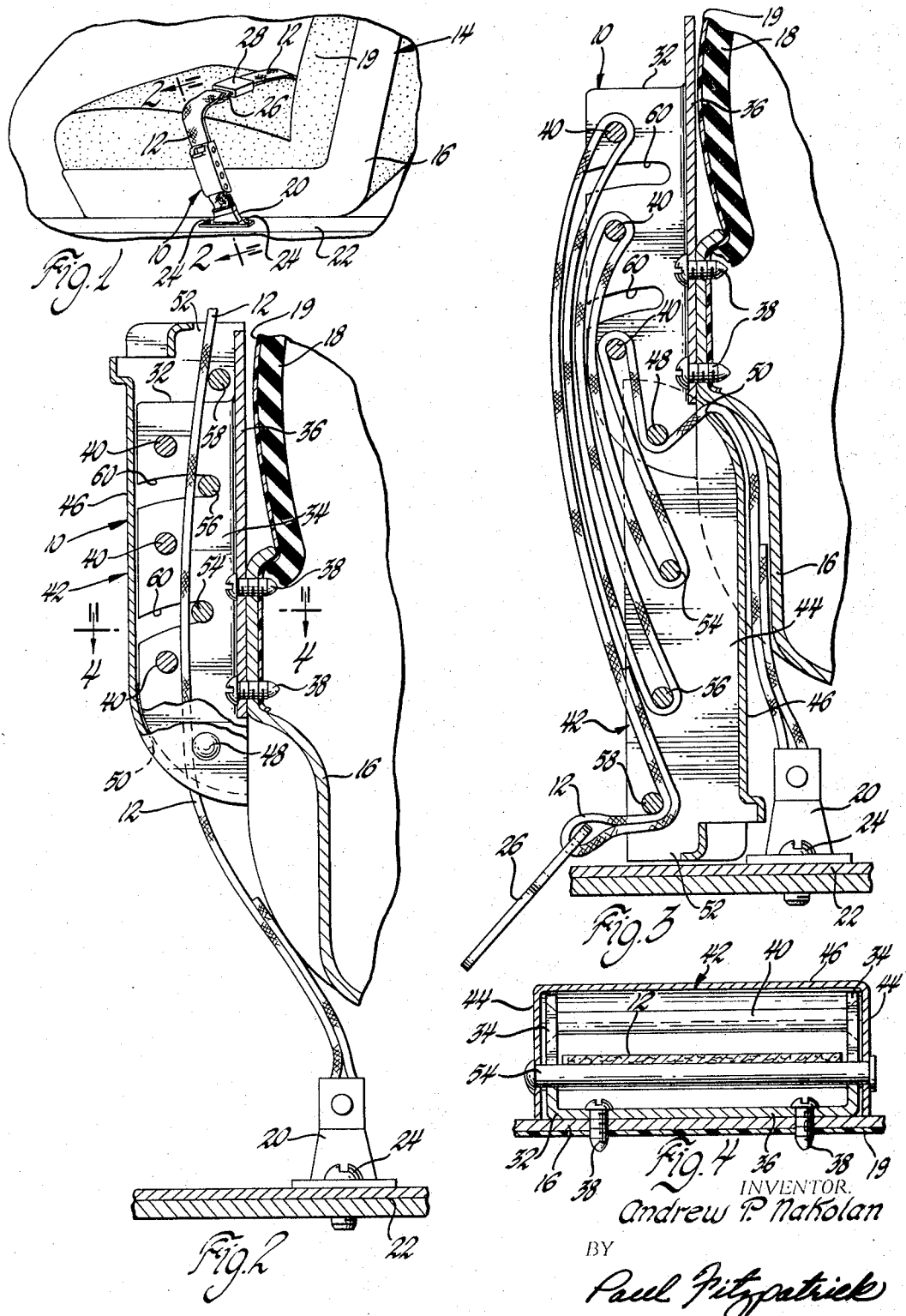

3,300,248
FOLDING SEAT BELT RETRACTOR
Andrew P. Nakolan, New Baltimore, Mich., assignor to General Motors Corporation, Detroit, Mich., a corporation of Delaware
Filed Feb. 25, 1966, Ser. No. 530,207
6 Claims. (Cl. 297—388)

This invention relates to a safety device for mounting in a vehicle to restrain the movement of a body within the vehicle when the body is subjected to accelerated movements relative to the vehicle and, more particularly, it relates to a safety seat belt retracting mechanism.

The use of seat belts to restrain the movement of driver and passengers in vehicles has become increasingly more popular. The standard seat belt devices comprise a buckle and a lock plate each attached by a separate length of belt to the floor of the vehicle on opposite sides of the seat. The lock plate is adapted to be inserted into the buckle mechanism to hold the person in the seat of the vehicle. When not in use, the standard seat belt components create a problem as to storage as they are usually left upon the seat or are strewn upon the floor of the vehicle. As a result, several types of retractor mechanisms have been introduced for the purpose of retracting and storing the seat belt members when not in use. These retractors frequently are of the floor-mounted type and also may be of the type that are installed at a location along the belt. Currently used retractors often involve complicated and expensive structural components. Hence, with the present practice of providing seat belts to accommodate four passengers, the use of such currently known retractors will result in a rather sizable expense. Thus, there is a great need for a relatively simple and economical seat belt retractor which can be used extensively without substantially increasing the cost of the vehicle.

It is, therefore, an object of this invention to provide a relatively simple and economical retractor mechanism for use in a vehicle to retract and store a safety seat belt when not in use.

Other objects, features, and advantages of this invention will become apparent upon reference to the following detailed description and the drawings depicting the preferred embodiment thereof, wherein:

FIGURE 1 is a schematic view of a seat belt assembly embodying the subject invention as applied to a vehicle seat;

FIGURE 2 is a sectional view taken in the plane of line 2—2 in FIGURE 1 showing a retractor mechanism in the unretracted position;

FIGURE 3 is the same sectional view as FIGURE 2 showing the retractor mechanism in the retracted position; and, FIGURE 4 is a sectional view taken in the plane of line 4—4 in FIGURE 2.

More particularly, FIGURE 1 shows a retractor assembly 10 embodying the subject invention as used in conjunction with a safety seat belt 12 and a vehicle seat 14. The vehicle seat 14 may be of any suitable type having a frame 16 covered with a cushion 18 and upholstery 19. The seat belt 12 is seen to be fixed at one end to a seat belt anchor 20 which is fastened to the vehicle floor pan 22 by bolts 24. The seat belt 12 has a lock plate 26 at its other end which is adapted to releasably engage a seat belt buckle 28 which in turn is connected by the other half of seat belt 12 to a fixed mounting (not shown) on the opposite side of the seat 14.

The retractor mechanism 10 which can best be seen in FIGURES 2, 3 and 4 includes a channel-shaped frame 32 having a pair of sides 34 and a base 36, which is fastened to the seat frame 16 by screws 38. Three pins 40 are mounted between and fixed to the sides 34 of the frame 32. As seen in FIGURE 2, the three pins 40 are vertically spaced from each other and equidistant from the base 36 of the frame 32.

A channel-shaped cover 42 having sides 44 connected by base 46 fits over and is pivotally mounted on the channel-shaped frame 32 at its lower extremity by a fixed pivot pin 48. The base 46 of the cover 42 includes an opening 50 at its lower extremity through which the belt 12 passes and an opening 52 at its upper extremity which provides a grasping means for manual pivotal movement of the cover 42 relative to the frame 32. The cover 42 has mounted between the sides thereof a plurality of pins 54, 56 and 58. These pins are fixed to the sides of the cover 42 in a similar manner to the way that pins 40 are fixed to the sides 34 of the frame 32. The pins 54 and 56 reside in arcuate slots 60 in the sides 34 of the frame 32 when the cover is in the position shown in FIGURE 2. The pin 58 is positioned beyond the ends of the sides 34 of the frame 38 and therefore does not require a slot in the frame 32. It should be noted that the pins 54, 56 and 58 have been positioned so that they alternate in vertical location with the slots 60 in the frame 32. It should also be noted that the pins 56 and 58 are positioned progressively further away from the base 46 of the cover 42 as compared with pin 54. The reason for this positioning of the pins 54, 56 and 58 will become apparent in the forthcoming discussion on the operation of the retracting mechanism.

The seat belt 12 is seen to pass through the frame 32 and the cover 42 in such a manner that it extends between the two rows of pins when the cover 42 is in the unretracted position as shown in FIGURE 2. As shown in FIGURE 3, the pins 54, 56 and 58 pivot in a counterclockwise direction when the cover 42 is pivoted downwardly to the retracted position. Since the seat belt 12 is inserted between the two rows of pins, pivoting movement of the cover 42 in a counterclockwise direction causes the pins 54, 56 and 58 to pick up the safety belt and pull is arcross the pins 40 thereby forming the belt into the loops shown in FIGURE 3 and as a result retracting the belt 12 and the latch plate 26. The pins 54, 56 and 58 are spaced progressively further away from the base 46 of the cover 42 so that the pin 54 nearest pivot 48 starts against the seat belt before the adjacent pin 56 contacts the belt. Since sliding friction is substantially less than static friction, the fact that the pins start their sliding action relatively to the seat belt sequentially rather than simultaneously results in less tendency for the pins to bind on the seat belt. Thus, as the cover 42 is pivoted from the position shown in FIGURE 2 to that shown in FIGURE 3, the seat belt 12 is formed into the loops shown in FIGURE 3 thereby retracting the seat belt to the retracting mechanism 10. It should be noted that the cover 42 is pivotally mounted to the frame 32 and positioned such that it is an over-center type mounting thereby causing the cover to normally want to rest in the down or retracted position as shown in FIGURE 3. Hence, upon release of the latch plate 26 from the buckle 28 the cover 42 will normally pivot downwardly relative to the frame 32 thereby retracting the seat belt and latch plate to the position shown in FIGURE 3. When use of the seat belt 12 is required, the latch plate 26 is merely lifted thereby pivoting the cover 42 back to the unretracted position as shown in FIGURE 2 and allowing the seat belt to be withdrawn from the retractor.

It should be noted that this entire retractor assembly includes merely a pair of channel-shaped members pivotally mounted to each other and pin members mounted across each of the channel-shaped members. This device thereby eliminates the need of the expensive parts needed for a spring actuated reel retractor. Thus, a relatively simple and economical seat belt retractor mechanism is provided which can effectively retract a seat belt into a neat storage pattern which eliminates the problem of storage of the belts when not in use. It should also be noted that although the subject folding type seat belt retractor has been disclosed as mounted on the side of a vehicle seat, it could also be mounted underneath the vehicle seat, on the body wall, or wherever there is sufficient room for the pivoting of the cover 42 relative to the frame 32.

Although but one embodiment of this invention has been described and shown in detail, it should be clear to those skilled in the art to which the invention pertains that many changes and modifications may be made thereto without departing from the scope of the invention.

I claim:
1. A take-up device for retracting a belt comprising:
a fixed first member;
a second member pivotally connected to said first member;
a plurality of pins parallel to said pivotal connection and spaced alternately on said first and second members;
said belt being laced between said alternating pins so as to be retracted into bights upon the pivoting of said second member relative to said first member.
2. A take-up device as set forth in claim 1 wherein said first and second members each include a pair of parallel sides between which said pins are mounted.
3. A take-up device as set forth in claim 2 wherein said first and second members each have a channel cross-section with a base connecting said parallel sides.
4. A take-up device as set forth in claim 3 wherein said first member has arcuate slots cut in its sides to receive the pins fixed to said second member.
5. A take-up device as set forth in claim 1 wherein the pins on said first member are spaced from the pins on said second member so that said belt can pass between said pins in substantially one plane.
6. A take-up device as set forth in claim 5 wherein the pins on said second member are spaced progressively further away from the base of said second member so that the pin closest to said pivotal connection between said first and second members contact said belt first upon pivoting of said second member relative to said first member.

References Cited by the Examiner

UNITED STATES PATENTS

| | | | |
|---|---|---|---|
| 3,107,121 | 10/1963 | Mougey | 297—388 |
| 3,164,409 | 1/1965 | Rumble | 297—388 |
| 3,199,918 | 8/1965 | Nakolan | 297—388 |
| 3,219,387 | 11/1965 | Peters | 297—388 |

FRANK B. SHERRY, *Primary Examiner.*

CASMIR A. NUNBERG, *Examiner.*